United States Patent Office 2,995,421
Patented Aug. 8, 1961

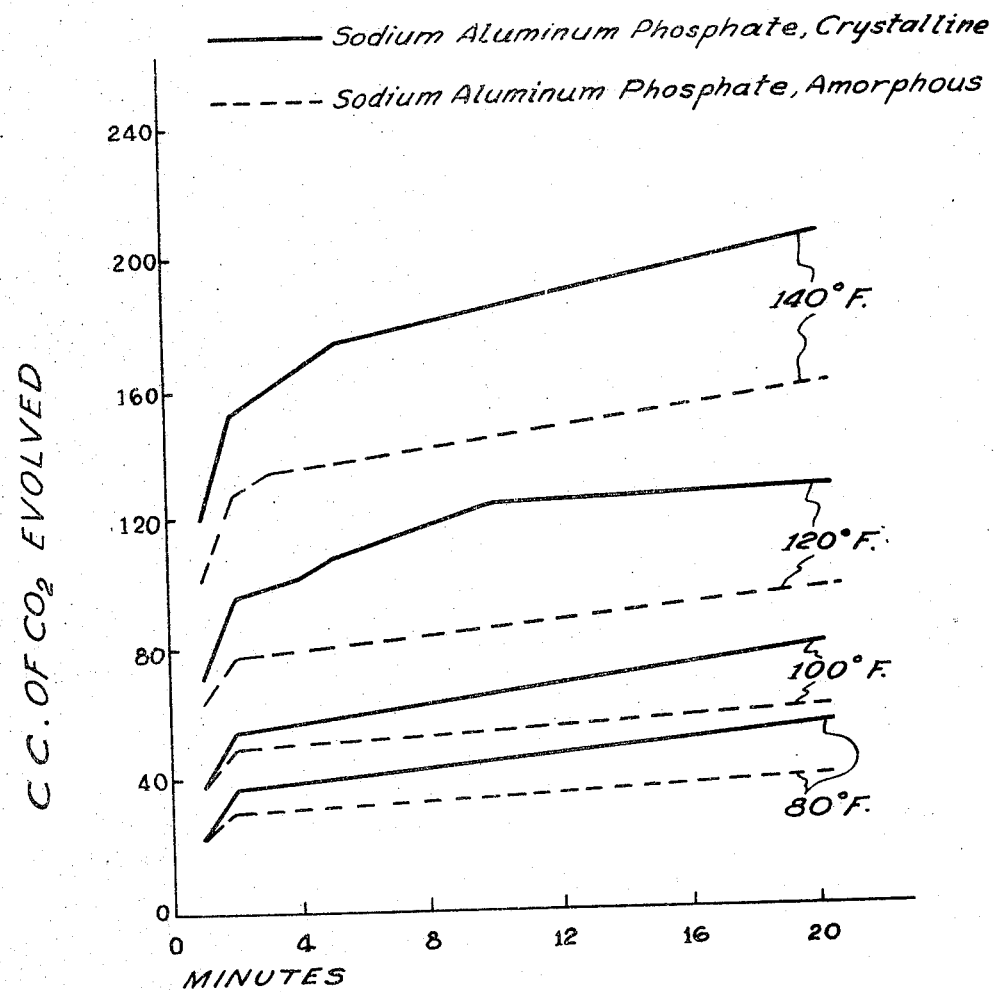
Cake Mix
Rates of Reaction
at Various Temperatures

2,995,421
AMORPHOUS SODIUM ALUMINUM PHOSPHATE
James N. Dyer, Matteson, Ill., assignor to Stauffer Chemical Company, New York, N.Y., a corporation of Delaware
Filed Dec. 17, 1959, Ser. No. 860,191
2 Claims. (Cl. 23—105)

This invention relates to amorphous sodium aluminum phosphate. This new amorphous product gives outstanding results when used as a baking acid in certain baked goods.

Sodium aluminum phosphate may herein be referred to as "SAP."

Crystalline sodium aluminum acid phosphate is a well-known baking acid which has been used commercially for many years. This compound is disclosed in U.S. Patents 2,550,490 and 2,550,491, and may be represented by the formula $NaAl_3H_{14}(PO_4)_8 \cdot 4H_2O$.

The new amorphous sodium aluminum phosphate of the present invention has been found to have entirely different characteristics than the crystalline prior art compound. It differs chemically, physically, and in terms of baking response when tested according to standard procedures. This amorphous sodium aluminum phosphate product may be represented by the following empirical formula:

$$NaAl_3H_{11}(PO_4)_7 \cdot 5-8(H_2O)$$

The amorphous form of the product is the principal characteristic responsible for the properties of this new product. The amorphous nature of the product is shown by the fact that an X-ray powder pattern is completely fogged or blank. That is to say, absolutely no characteristic lines are present. Due to the fact that this new compound lacks a crystalline structure, an exact chemical characterization is quite difficult. Chemical analysis of this compound indicates that it conforms very closely to the empirical formula $NaAl_3H_{11}(PO_4)_7 \cdot 5-8(H_2O)$. This is subject to some degree of interpretation, particularly with respect to amounts of hydrate water and acidic hydrogen.

Differential thermal analysis shows that the hydrate water present in the new amorphous sodium aluminum phosphate is lost gradually on heating and is not removed at a definite temperature, as it would in the case of a crystalline hydrate. This gradual change in degree of hydration is a characteristic of amorphous compounds. Also, since a definite crystal hydrate does not form, the amount of hydrate water in a given compound will vary with different batches or will vary due to differences in the method of preparation. The levels of hydrate water have been found varying from about 5 to about 8 moles per mole of sodium aluminum phosphate.

In sharp contrast to the crystalline compounds disclosed in the prior art, the new amorphous compound of the present invention has entirely different baking characteristics. For instance, a common use for such baking acids is in the manufacture of doughnuts. A common test used in evaluating such baking acids is the doughnut rate of reaction test or simply the "doughnut rate."

This test is conducted by reacting doughnut doughs containing sodium bicarbonate and sodium aluminum phosphate in proportion and amount to liberate 200 cc. of $CO_2$ when suspended in water at 27° C. The amount of gas evolved in 2 minutes is measured as well as the amount evolved in 15 minutes. The difference in these two values is highly indicative of the effectiveness of the particular baking acid in retaining the $CO_2$ for release during the baking period. A comparison of the prior art product and the new amorphous product herein disclosed and claimed (i.e., "New Amorphous SAP") is set forth in Table I, infra.

TABLE I

| Baking Acid | Doughnut Reaction Rates | | |
|---|---|---|---|
| | 2 Min., cc. | 15 Min., cc. | 2-15 Min. Difference, cc. |
| Crystalline Prior Art SAP | 41.6 | 58.6 | 17 |
| New Amorphous SAP | 44 | 49 | 5 |

It can be seen from Table I that the new product has an exceptionally retarded rate of reaction during the 2-15 minute period. A value in the neighborhood of 5 for the 2-15 minute difference is very desirable in certain applications.

9 second test commonly used in evaluating baking acids is the baking powder rate of reaction. This test is similar to the "doughnut rate" test in that sufficient baking acid and sodium bicarbonate to liberate 200 cc. of $CO_2$ are used. The ingredients are simply suspended in water at 27° C., however, so the rate of evolution is somewhat different. The amount of evolution in this case is measured at intervals of 2 minutes and 10 minutes and the 2-10 minute difference is compared. A comparison of the amorphous product and the prior art compound is shown in Table II, infra.

TABLE II

| Baking Acid | Baking Powder Reaction Rates | | |
|---|---|---|---|
| | 2 Min., cc. | 10 Min., cc. | 2-10 Min., Difference, cc. |
| Prior Art SAP | 32 | 69 | 37 |
| New Amorphous SAP | 14 | 28 | 14 |

Again, it can be seen from Table II that the new product has a more retarded rate of reaction during the 2-10 minute period.

A further comparison is shown in the accompanying figure, wherein the rates of reaction in cake mixes are compared at various temperatures. As in the previously described tests, sufficient baking acid and sodium bicarbonate were present to yield 200 cc. of $CO_2$. The figure clearly shows that throughout the range of 80° F. to 140° F. the amorphous sodium aluminum phosphate consistently conserves more $CO_2$ for later availability at baking temperatures.

Since there is very little bench action up to 100° F. with this new baking acid, and since it begins to become more vigorous at 120° F., this product is particularly valuable for use in such products as refrigerated biscuit doughs.

When used in these well-known refrigerated canned biscuit doughs, many advantages result from using the new amorphous sodium aluminum phosphate, as compared with the prior art baking acids, such as sodium acid pyrophosphate. There is an improved flavor and an improved tenderness in eating quality. The finished biscuits have an equal or slightly better specific volume. There is a decrease in pressure in the cans during storage and an attendant higher percentage of available $CO_2$ in the dough after storage. The dough also maintains an equal or slightly better appearance during storage. Thus, there is a significant over-all advantage in the use of my amorphous sodium aluminum phosphate in canned refrigerated biscuit doughs.

The difference in pressure referred to above is illustrated by the data set forth in Table III, infra, relative to refrigerated canned biscuits. The doughs were processed at 60° F., sealed into cans (standard commercial cardboard containers with metal ends), and placed in a cabinet at 90° F. to speed up the baking acid-soda reaction in order to develop a $CO_2$ pressure atmosphere. When the pressure reached 15 p.s.i., the cans were removed and refrigerated for future use.

TABLE III

*Proofing pressure—refrigerated biscuits—90° F.*

| Baking Acid | Minutes After Processing | | | | |
|---|---|---|---|---|---|
| | 15 | 30 | 45 | 60 | 75 |
| Amorphous SAP............p.s.i.g.. | 0 | 0 | 0 | 0 | 0 |
| Crystalline SAP.............p.s.i.g.. | 0 | 9 | 15 | | |
| Sodium Acid Pyrophosphate..p.s.i.g.. | 0 | 0 | 7 | 15 | |

It is readily seen from Table III that the amorphous SAP is much less reactive than the prior art materials. In fact, a faster acting acid must usually be added to amorphous SAP in order to provide sufficient pressure for proper storage.

One method of making this new product is illustrated in Example I. Briefly, the method set forth in Example I comprises: incorporating alumina and soda ash with phosphoric acid in the presence of water, the ratio of reactants being in stoichiometric proportions to provide sodium and aluminum in a ratio of about 1 to about 3, respectively, and a stoichiometric amount of phosphoric acid being used to react with the sodium and aluminum, said admixture forming a sodium aluminum phosphate reaction product; heating the sodium aluminum phosphate reaction product to increase the solubility of the sodium aluminum phosphate and to form a solution; cooling the heated admixture to room temperature; removing unreacted material from the cooled reaction product; heating the solution and dissolving additional soda ash therein; and spray drying the solution to form amorphous sodium aluminum phosphate.

EXAMPLE I 8.5 lbs. of 83% phosphoric acid was first heated to 80° C. with good agitation. To this hot acid was added a mixture of 2.6 lbs. of $Al_2O_3 \cdot 3H_2O$ and 0.575 lb. of $Na_2CO_3$ over a period of approximately three hours. Sufficient additional water was also added during this period to keep the viscosity at a workable level and to replace that which was lost during the reaction. This resulted in a 70% solution of sodium aluminum phosphate, which was held at approximately 80° C. for two hours with good agitation. The solution was cooled overnight to room temperature and then diluted to 40% and filtered to remove any unreacted material.

Prior to spray drying, the solution was again heated to 80° C. and an additional 0.073 lb. of soda ash was added and dissolved. This solution was then spray dried in a laboratory dryer using a gas inlet temperature of 425° F. and an outlet temperature of 250° F.

The resulting product analyzed as follows:

Percent $P_2O_5$ ------------------------------- 52.8
Percent $Al_2O_3$ ------------------------------ 15.7
Percent $Na_2O$ ------------------------------- 3.1
Percent loss on ignition----------------------- 27.4
Percent loss, 140° C-------------------------- 14.5

This product gave an absolutely blank X-ray powder pattern.

In producing this amorphous product, the ordinary commercial grades of phosphoric acid, alumina and soda ash were used.

The foregoing detailed description has been given for clearness of understanding only, and no unnecessary limitations should be understood therefrom, as modifications will be obvious to those skilled in the art.

I claim:

1. Amorphous sodium aluminum phosphate having an empirical formula essentially represented by $$NaAl_3H_{11}(PO_4)_7 \cdot 5-8H_2O$$

that (*a*) gives a blank X-ray powder diffraction pattern, (*b*) loses water of hydration gradually upon heating, and (*c*) has greater retardation of reaction with sodium bicarbonate at pre-baking temperatures than crystalline sodium aluminum phosphate.

2. Amorphous sodium aluminum phosphate having an empirical formula essentially represented by $$NaAl_3H_{11}(PO_4)_7 \cdot 5-8H_2O$$

that (*a*) gives a blank X-ray powder diffraction pattern, (*b*) upon differential thermal analysis loses water gradually upon heating, (*c*) has markedly greater retardation of reaction than crystalline sodium aluminum phosphate during the 2–15 minute period of a doughnut reaction rate test, and (*d*) has markedly greater retardation of reaction than crystalline sodium aluminum phosphate during the 2–10 minute period of baking powder reaction rate test.

References Cited in the file of this patent

UNITED STATES PATENTS 2,550,490     McDonald ------------- Apr. 24, 1951

OTHER REFERENCES

Mellor: "Comprehensive Treatise on Inorganic and Theoretical Chemistry," vol. 5, page 367, Longmans, Green and Co., 1924.

UNITED STATES PATENT OFFICE
CERTIFICATE OF CORRECTION

Patent No. 2,995,421 August 8, 1961

James N. Dyer

It is hereby certified that error appears in the above numbered patent requiring correction and that the said Letters Patent should read as corrected below.

Column 2, line 19, for "9" read -- A --; line 43, for "the accompanying" read -- accompanying the --.

Signed and sealed this 16th day of January 1962.

(SEAL)
Attest:

ERNEST W. SWIDER
Attesting Officer

DAVID L. LADD
Commissioner of Patents